US012437179B2

(12) United States Patent
Neitzke

(10) Patent No.: US 12,437,179 B2
(45) Date of Patent: Oct. 7, 2025

(54) MODULAR AMMUNITION COUNTER

(71) Applicant: Laminar Engineering LLC, Yuma, AZ (US)

(72) Inventor: Spencer Neitzke, Yuma, AZ (US)

(73) Assignee: LAMINAR ENGINEERING LLC, Yuma, AZ (US)

( * ) Notice: Subject to any disclaimer, the term of this patent is extended or adjusted under 35 U.S.C. 154(b) by 100 days.

(21) Appl. No.: 18/241,886

(22) Filed: Sep. 3, 2023

(65) Prior Publication Data

US 2025/0077829 A1 Mar. 6, 2025

(51) Int. Cl.

| | |
|---|---|
| ***F41A 9/00*** | (2006.01) |
| ***F41A 9/86*** | (2006.01) |
| ***G06M 1/10*** | (2006.01) |
| ***G06M 15/00*** | (2011.01) |

(52) U.S. Cl.

CPC ............... *G06M 1/101* (2013.01); *F41A 9/86* (2013.01); *G06M 15/00* (2022.08)

(58) Field of Classification Search

CPC ...... F41A 9/79; F41A 9/80; F41A 9/64; F41A 9/62; F41A 9/29; F41A 9/01; F41A 9/86

See application file for complete search history.

(56) References Cited

U.S. PATENT DOCUMENTS

| | | | | |
|---|---|---|---|---|
| 4,506,588 A | 3/1985 | Kazanjy | | |
| 5,020,414 A | 6/1991 | Cook | | |
| 5,826,360 A * | 10/1998 | Herold | F41A 9/62 | 42/1.02 |
| 7,802,391 B2 | 9/2010 | Quinn et al. | | |
| 9,273,918 B2 * | 3/2016 | Amit | F41A 19/01 | |
| 10,254,066 B1 * | 4/2019 | Petersen | F41A 9/29 | |
| 11,466,947 B2 | 10/2022 | Masarik et al. | | |
| 2015/0113847 A1 * | 4/2015 | Acarreta | F41A 9/62 | 42/1.01 |
| 2024/0200894 A1 * | 6/2024 | Oppenheim | F41G 1/38 | |

FOREIGN PATENT DOCUMENTS

CA 3121999 A1 1/2022

OTHER PUBLICATIONS

Rounds Counter—Dillon Aero, downloaded from Internet Dec. 6, 2023, 1 page.

* cited by examiner

*Primary Examiner* — Tuan T Lam

(74) *Attorney, Agent, or Firm* — John L. DeAngelis; Wolter Van Dyke Davis, Pllc

(57) ABSTRACT

A method and apparatus for counting belted or bulk ammunition rounds. The modular ammunition counter includes a detachable electronics assembly, an ammunition guide for receiving the ammunition rounds, and a sensor module. The electronics assembly is configured to count the number of ammunition rounds that pass through the coupled ammunition guide. This method of ammunition round counting offers a significant improvement in speed and accuracy compared to manually counting the ammunition rounds by hand.

17 Claims, 11 Drawing Sheets

MODULAR AMMUNITION COUNTER

FIELD OF THE INVENTION

The present invention relates to the field of ammunition counting devices, including certain embodiments directed to counting of ammunition in bulk pack or belted configurations, which are commonly used in conjunction with small arms and medium caliber weapons.

BACKGROUND OF THE INVENTION

Typically, ammunition counting, whether the ammunition is in belted configuration of bulk-pack is performed manually by hand. Such manual ammunition counting is a laborious and error-prone task that takes a significant amount of time. Belted ammunition consists of ammunition cartridges that are connected together with ammunition links. Operators usually delink large belts of ammunition, often comprising 1500 rounds or more, into smaller, more manageable chunks for counting. However, during this process, the ammunition and the links may be subjected to repeated wear, leading to weakening. In some cases, this can cause weapon malfunctions. Furthermore, re-linking these segments into the desired length for firing is often prone to errors, which can also contribute to weapon malfunctions. Occasionally, operators leave ammunition in the smaller, more manageable chunks until the next time it is needed, which increases the amount of time required to ready a weapon system.

One automatic ammunition counting device is described in U.S. Pat. No. 10,254,066 granted to Peterson et al. The Peterson device is a unique ammunition counter that can count only a single type of ammunition, requiring operators to use multiple such devices to count ammunition of different calibers. This can be both costly and inconvenient. Additionally, the Peterson device requires the use of two LEDs for cartridge sensing, a practice that is unnecessary and increases power consumption.

Another ammunition counting device is described in U.S. Pat. No. 5,020,414 granted to Mark A. Cook. However, this device is a mechanical counter that requires physical contact with each individual cartridge, leading to increased wear and tear. Moreover, the device contains numerous components that may require regular replacement, adding to maintenance costs. Finally, like the Peterson device, this device is designed for only a single caliber of ammunition, which can be inconvenient and costly if multiple calibers need to be counted.

BRIEF DESCRIPTION OF THE DRAWINGS

The invention will be more clearly understood from the following detailed description of implementations thereof read in conjunction with the accompanying drawings, in which the like reference numerals refer to like components throughout several views thereof.

DETAILED DESCRIPTION OF THE INVENTION

Figure 1:
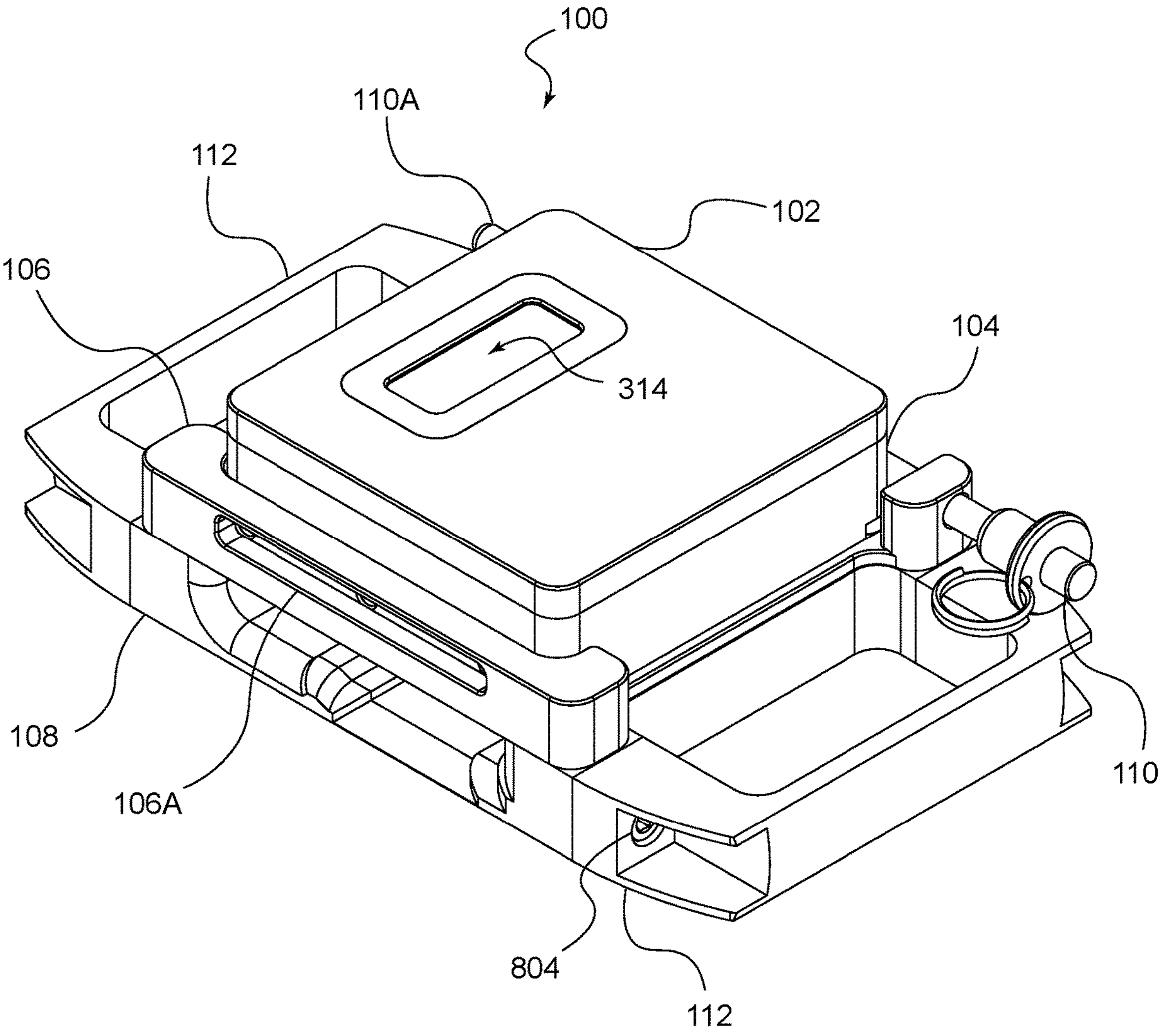
FIG. 1 is a perspective view of an implementation of a modular ammunition counter device according to the present invention.

The aspects and implementations of the disclosure are not limited to the specific components, assembly procedures or method elements disclosed herein. Many additional components, assembly, procedures and/or method elements known in the art consistent with the intended modular ammunition counting device will become apparent for use with particular implementations from this disclosure. Although particular implementations are disclosed, such implementations and implementing components may comprise any shape, size, style, type, model version, measurement, concentration, material, quantity, method element, step, and/or the like as is known in the art for such modular ammunition round counting devices and implementing components and methods, consistent with the intended operations and methods.

The systems, methods, and devices of the modular ammunition counting device of the present invention each have several innovative aspects and concepts, no single one of which is solely responsible for all of the desirable attributes disclosed herein.

An ammunition counting device of the present invention may include: an ammunition guide, where the ammunition guide dimensions and elements are specified for a specific type of ammunition and/or caliber that is to be counted; an electronics assembly including a sensor assembly further comprising at least one light emitting diode (LED) and at least two photosensors; a display screen on an external-facing surface of the device; a battery pack operatively coupled with the electronics assembly. Those skilled in the art are aware of other emitting and sensing components based on other forms of energy, such as ultrasonic devices based on sound energy, that can be used in lieu of an LED and photosensors.

The counter of the present invention is compatible with various ammunition guides that accommodate different ammunition calibers. As described further herein, the guides properly position the rounds relative to the counting elements. The counter may be used to count ammunition cartridges of 5.56 NATO, 7.62 NATO, .50 BMG, 20 mm, 25 mm, or other types of ammunition, in either a belted or a bulk pack configuration. In addition to acting as a guide for ammunition, in one embodiment the guide comprises round repositioning elements.

In the case of singular rounds an operator may feed the rounds one-by-one. In a preferred embodiment the ammunition counter of the present invention interfaces with an existing ammunition handling system. For example, 20 mm ammunition is supplied in a bulk pack configuration, and loaded into an ammunition storage unit using specialized loading equipment. Thus, the modular ammunition counter serves as a "middleman" between the loading equipment and the storage unit, counting the rounds as they are loaded or unloaded.

The modular ammunition counter allows the operator to leave ammunition in a belted configuration for counting and thereby reduces the likelihood of human induced counting errors or weapon malfunctions due to improperly re-belted rounds. Requiring ammunition belts to be disassembled into smaller sections for counting is a slow manual process; and after counting the individual belted sections need to be manually linked into a belt of appropriate length (or having an appropriate ammunition count) for usage. This prior art technique is apt to result in incorrect counts and possible damage to the rounds during the removal and reinsertion processes.

Referring to the drawings in which the like reference numerals refer to like components throughout the several views thereof, the manner of use of the implementation of the modular ammunition counter is as follows:

Referring to FIG. 1, an embodiment of a modular ammunition counter device 100 is illustrated. In this particular embodiment, the device comprises an electronics assembly cover 102, an electronics assembly housing 104, a quick-release fixture plate 106, and an ammunition guide 108. The cover 102 and housing 104 are disposed on an upper surface of the ammunition guide 108.

A display module 314 is visible through a display window within the electronics assembly cover 102. The display module displays various operational states of the counter device, as well as both the final and current ammunition count.

The counting device includes a quick release interface plate 106, (See FIG. 1) to which an ammunition guide 108 and handles 112 are removably attached. The interface plate 106, the ammunition guide 108, and the handles 112 are designed to accommodate a specific ammunition caliber and these elements cannot be easily disconnected from each other. But these components can be quickly released, as an assembly, from the electronics assembly housing 104, and replaced with components configured to count a different caliber that can be quickly and easily attached to the electronics assembly housing.

To switch the counting device to count a different caliber, the operator detaches a current interface plate (with its attached ammunition guide 108 and handles 112) and attaches a different interface plate (with its handles and ammunition guide dimensioned for a different caliber). Use of the interface plate 106 and its quick release feature allows for quick and easy decoupling and coupling of ammunition guides, allowing quick and easy reconfiguring of the ammunition counting device for counting different caliber ammunition. The quick release feature may utilize any suitable components that allow rapid coupling and uncoupling of the interface plate 106 (and its attached ammunition guide 108 and handles 112) from the electronics assembly housing, as further described below.

With reference to FIG. 1, the quick-release fixture plate 106 also serves as an interface between the ammunition guide 108 and the electronics assembly housing 104.

As illustrated in FIG. 1, this quick-release feature is implemented, in one embodiment, by a removable pin 110 that secures the quick release fixture plate 106 (and thus also to the ammunition guide 108 and the handles 112) to the electronics assembly housing 104. As can be seen in other Figures, the pin 110 extends along one side of the electronics housing 104 with a terminal end of the pin 110 identified by reference character 110A in FIG. 1.

Figure 10:
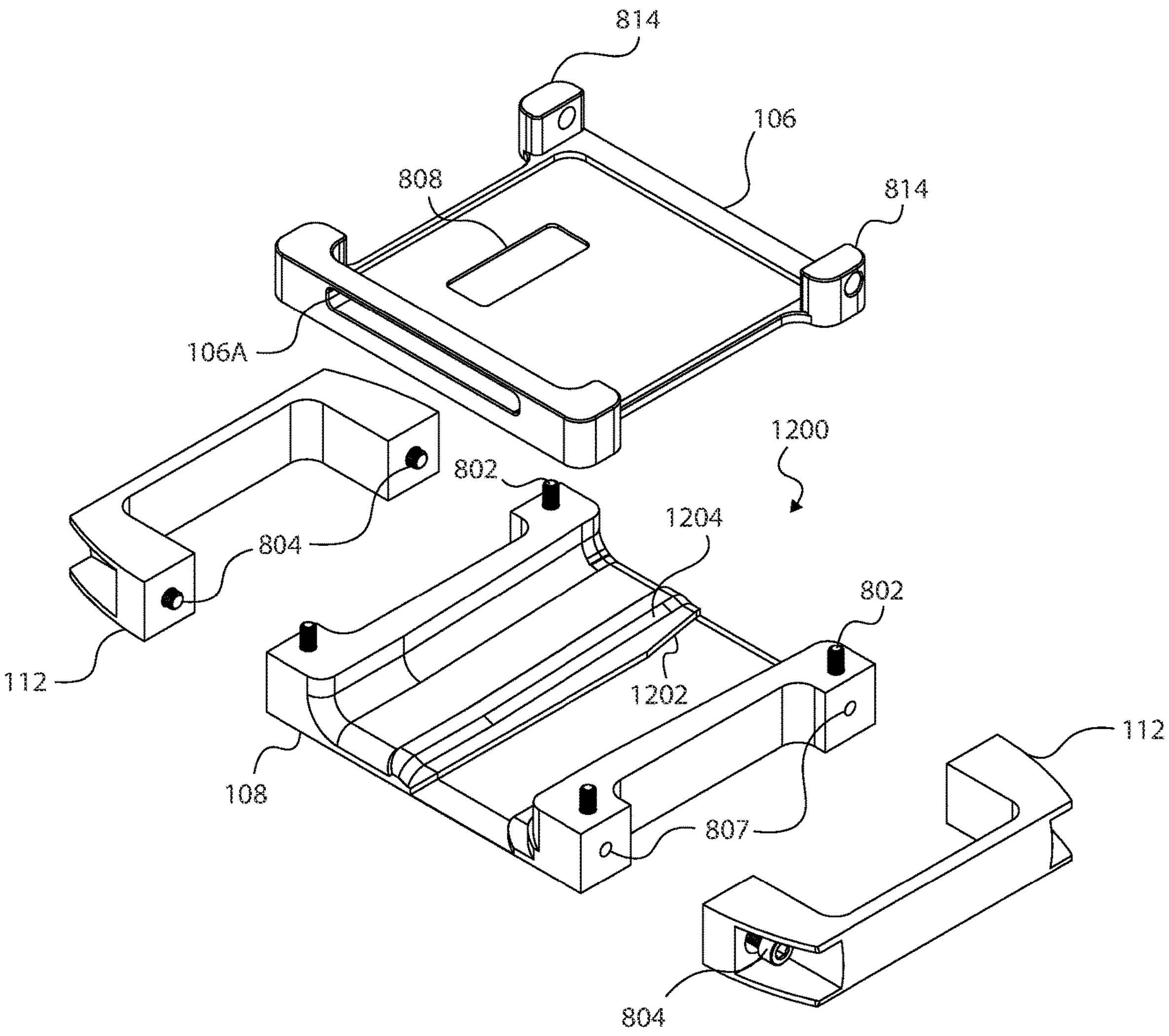
FIG. 10 illustrates an exploded view of the interface plate, ammunition guide, and handles, elements of the modular ammunition counter of FIG. 1.

The assembly of the fixture plate 106, the ammunition guide 108, and the handles 112 are illustrated in the exploded view of FIG. 10. The ammunition guide 108 is attached to the quick-release fixture plate 106 with screws 802 inserted into mating threaded holes (not visible in FIG. 10) in the fixture plate 106. The handles 112 are also attached to the quick-release fixture plate 106 with screws 804 inserted into mating threaded holes 807.

Figure 2:
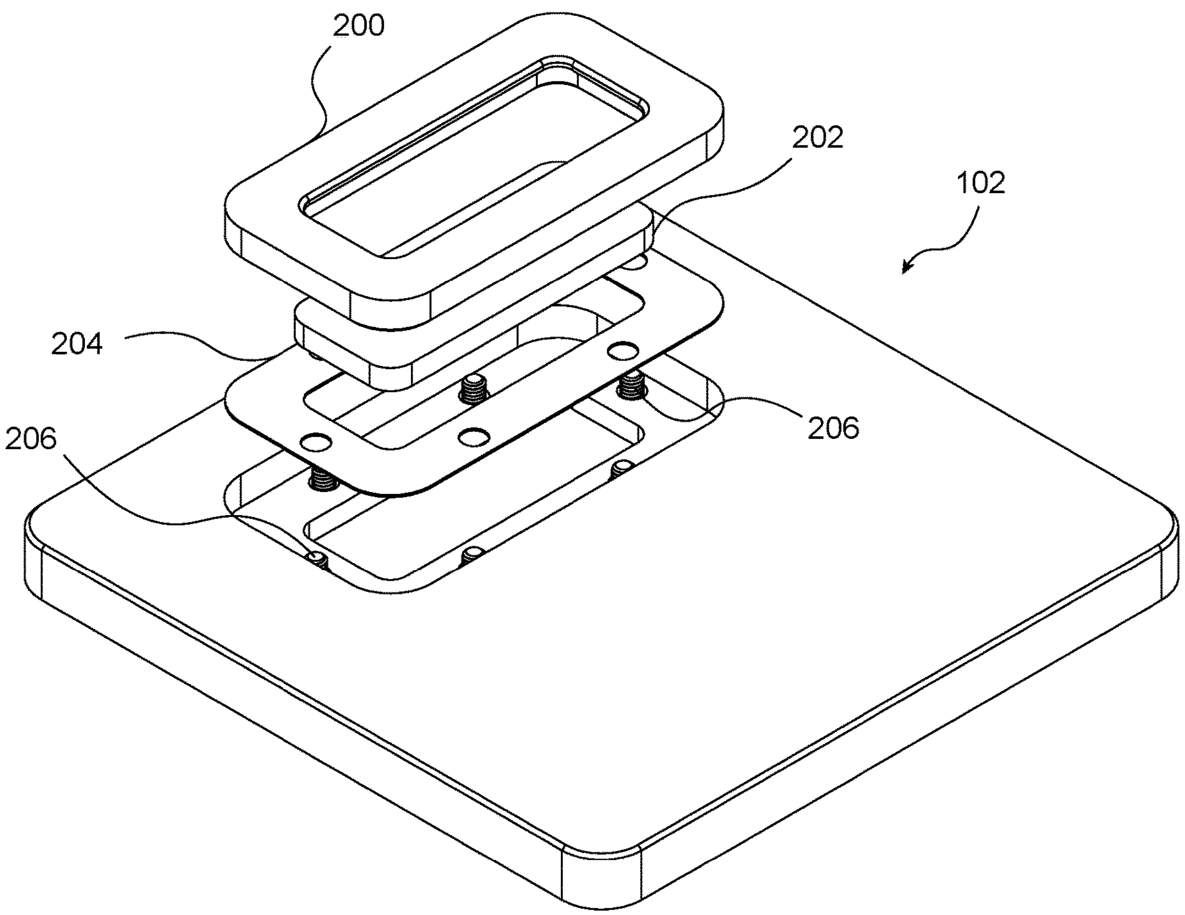
FIG. 2 is an exploded perspective view of an implementation of an electronics assembly cover of FIG. 1.

Referring now to FIG. 2, an exploded perspective view of one implementation of the electronics assembly cover 102 is illustrated. The cover 102 may be manufactured from aluminum, steel, plastics, composites, or any other material suitable for the application.

In this particular implementation, the electronics assembly cover 102 comprises a display viewport sealing plate 200, a display viewport window 202, and a display viewport gasket 204. The display viewport sealing plate 200 serves to compress the display viewport window 202 against the display viewport gasket 204. The display (not shown in FIG. 2) is soldered to a printed circuit board (PCB) below the housing cover and visible through the display viewport window 202 of the assembled ammunition counter.

In one embodiment, the gasket 204 is manufactured from nitrile butadiene rubber also referred to as Nitrile Buna N (a trademark of Pittway Corp. of Northbrook, IL) material. Compression of the display viewport gasket seals the viewport sealing plate 200 against the cover 102 prevents moisture ingress into the electronics assembly housing 104, which is disposed immediately below the cover 102.

In some applications, the electronics assembly cover 102 may omit the display viewport gasket 204 for operating the device in environments not subject to moisture or particulate ingress.

The display viewport sealing plate 200 may be manufactured from any material with suitable rigidity to allow for uniform compression of the display viewport gasket. In various implementations, the compression required to prevent moisture ingress is provided by display viewport sealing plate screws 206. In various implementations, the display viewport window 202 may include materials with favorable optical characteristics such as Acrylic or Lexan® material (a registered trademark of General Electric Company headquartered in Boston MA).

Figure 3:
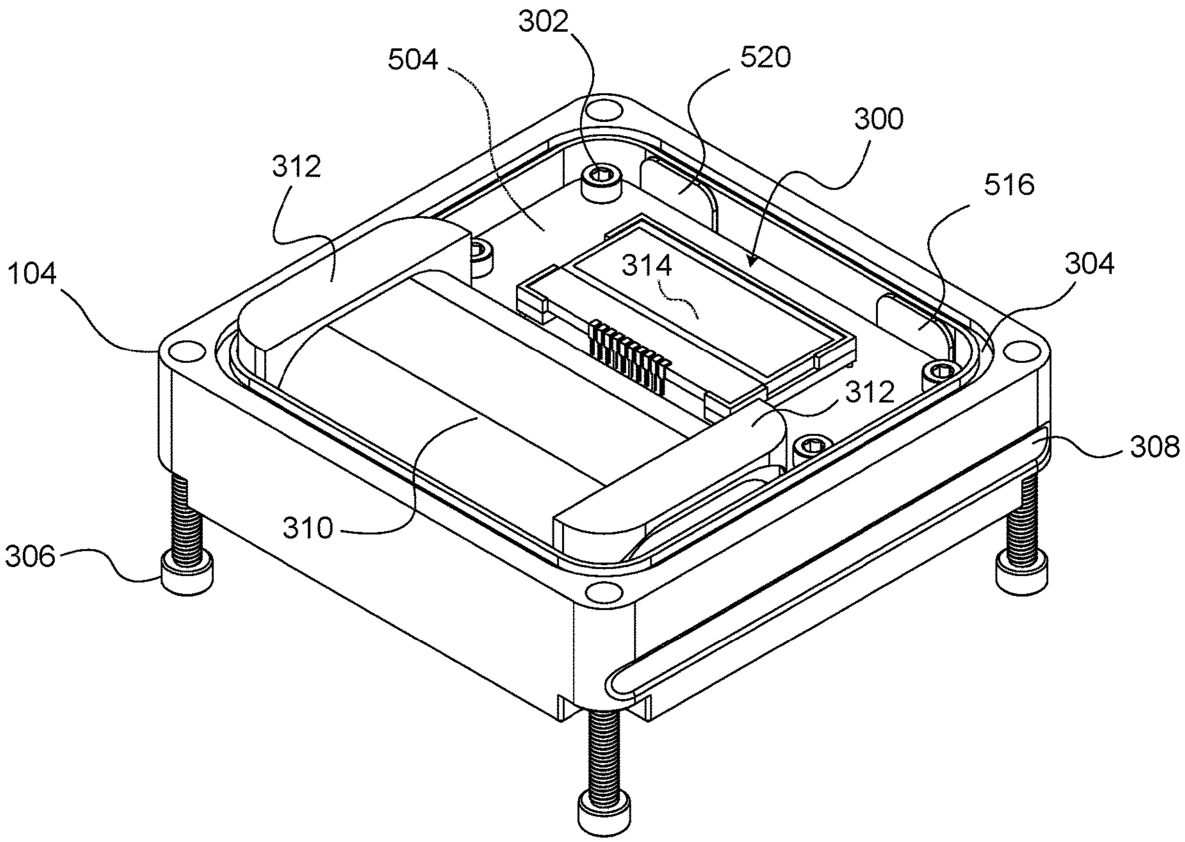
FIGS. 3 and 4 are perspective top and bottom views of an implementation of an electronics assembly housing of FIG. 1.

FIG. 3 is a perspective top view of the electronics assembly housing 104, showing the components within the electronics assembly housing 104, and screws 306 that attach the housing to the electronics assembly cover 102, which is not shown in FIG. 3.

An electronics assembly 300 (see FIG. 3) is disposed within the electronics assembly housing 104. The electronics assembly 300 includes the display module 314. In one implementation, the display module comprises an OLED display. In other implementations, the display module may comprise a low power ePaper display, a liquid crystal display (LCD), an in-plane switching monitor (IPS), a thin film transistor display (TFT), or another suitable device for displaying information to an operator. This display module 314 is mounted below and viewable through the display viewport window 202 disposed within the cover 102. The window 202 and the cover 102 are both illustrated in FIG. 2; the display module is not shown in FIG. 2.

The electronics assembly 300 also includes components and logic to count ammunition cartridges and display the ammunition count to the operator on the display module 314. The electronics assembly is described in greater detail below.

The display module 314 may be operatively and mechanically affixed (e.g., soldered) to a main printed circuit board 504. The circuit board 504 is affixed to the interior of the electronics assembly housing 104 through the use of a plurality of screws 302 spaced around perimeter of the circuit board. The screws 302 are mated with threaded holes (not shown) within the housing 104. The display module may be configured, by the operator, to display current rounds count, projected battery life, and other operational details.

In various implementations, the electronics assembly housing 104 may include a groove 304 (see FIG. 3) on a top surface thereof for receiving a sealing O-ring or gasket, not shown in FIG. 3. Compression of the electronics assembly housing cover 102 against an O-ring or gasket within the groove 304 may provide a sealing interface between the housing cover and the housing to prevent moisture or particulate ingress.

In this particular implementation, the electronics assembly housing cover 102 (not shown in FIG. 3) is secured to the electronics assembly housing 104 with screws 306 that extend upwardly through the housing 104 for receiving within threaded holes in the cover 102. Tightening of the screws 306 provides the compression necessary to ensure a seal is formed between the housing 104 and the cover 102. The intervening O-ring or gasket 304 may be manufactured from nitrile butadiene rubber material.

Returning to FIG. 1, the electronics assembly housing 104 affixes to the quick release fixture plate 106 (and thus the ammunition guide 108 and handles 112). Coupling of the electronics assembly housing to the fixture plate, instead of directly to the ammunition guide, reduces manufacturing cost and also protects the bottom face of the "expensive" counter (i.e., the electronics components within the electronics assembly housing 104) from damage during operation.

In various embodiments, the electronic housing assembly 104 is coupled to the quick release fixture plate 106 (and thereby to the ammunition guide 108 and the handles 112) through the use of a quick-release pin, a dovetail, Velcro, or an Arca-Swiss Interface. See, for example, a pin 110 in FIG. 1 that couples the electronic housing assembly 104 to the fixture plate 106/guide 108. A recessed region 308 (visible in FIG. 3 and referred to as the quick-release pin notch) is machined into the electronics assembly housing 104, thereby allowing the pin 110 to securely affix the housing 104 to the fixture plate 106.

As known by those skilled in the art, the modular ammunition counting device in fact, counts the cartridges, that is, the brass portion of the ammunition, excluding the primer and projectile. The sensors, as further described below, focus on the cartridge, rather than the projectile. In this respect, any ammunition type can be counted, even blanks without installed projectiles.

In one implementation, the electronic assembly housing 104 includes a battery module 310. See the interior of the electronics assembly housing 104 in FIG. 3. The battery module may be manufactured from lithium polymer, lithium iron phosphate, nickel cadmium, alkaline, or any other suitable battery chemistry. One implementation employs a commercially available lithium polymer-based cell. The considerations relevant to battery selection will be apparent to those skilled in the art. The battery module may be rechargeable and replaceable, making the device portable and easy to use in a variety of locations and settings.

As also shown in FIG. 3, the battery module 310 is sandwiched between two battery fixtures 312, constraining movement of the battery module 310. In some implementations, upper interior surfaces of the electronics assembly cover 102 and lower interior surfaces of the electronics assembly housing 104 are covered with closed or open cell foam; this additional element serves to further cushion and constrain battery module movement and dampen the effects of external shocks.

An embodiment of the ammunition counter device intended for non-portable use may omit the battery module. In this configuration, the electronics assembly is powered via a wall adapter or from another suitable power source.

Figure 4:
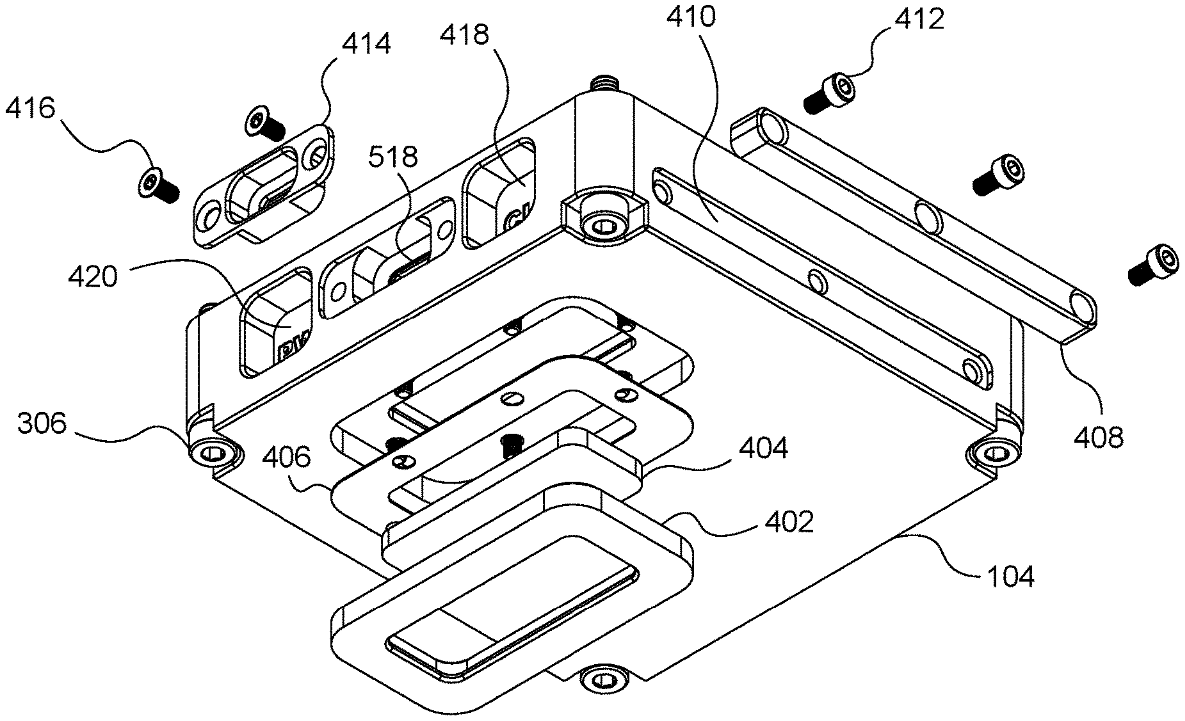

FIG. 4 is an exploded perspective view of a bottom surface of one implementation of the electronics housing assembly 104 for use with the modular ammunition counter of the present invention. In this implementation, the electronics housing assembly 104 includes a sensor viewport sealing plate 402, a sensor viewport window 404, and a sensor viewport gasket 406. In a fashion similar to the aforementioned display viewport sealing plate 200, the sensor viewport sealing plate 402 serves to compress the window 404 against the gasket 406 creating a seal to prevent moisture and particulate ingress into the electronics assembly housing 104.

The light emitting diode and photosensors, further described below, are located within the electronics assembly housing 104 such that the incident and reflected light rays pass through the window 404, striking and reflecting from the ammunition rounds that passes through the ammunition guide 108 disposed below the electronics housing 104. This arrangement can be more clearly appreciated from FIG. 1, depicting the housing 104 set atop the ammunition counter 108. The window 404 is in the bottom surface of the housing 104 and thus not visible in FIG. 1.

Continuing with FIG. 4, a shoe 408 is received within a well 410 machined into the housing 104 and affixed thereto with screws 412. The shoe serves as a locational member that mates with a recess in the quick-release fixture plate 104. This configuration is described in greater detail below in conjunction with FIG. 8.

The electronics assembly housing 104 incorporates an interface port cover 414, which is attached to the housing 104 with screws 416. The port cover 414 merely serves to provide a sealing surface for an interface receptacle gasket (not shown in FIG. 4), that is the port cover seats against the interface receptacle gasket. The receptacle gasket is incorporated into a USB Type C port (in one embodiment) 518 for sending signals to and receiving signals from an external device and charging the modular ammunition counter.

A primary capacitive touch area 418 and a secondary capacitive touch area 420 are shown as recessed areas within the electronics assembly housing 104. These recessed areas are bounded by thin walled sections that form capacitive interfaces for use by an operator to control operation of the counting device. The touch areas 418 and 420 allow an operator to make menu selections and wake-up the device. The capacitive touch areas may be configured to recognize various operator inputs, such as single press, double press, and long press gestures. Unlike a typical capacitive touch sensor, which relies on the detection of capacitance changes due to contact with an operator's finger, the touch areas 418 and 420 are not electrically connected to capacitive touch sensors (which are not illustrated in FIG. 4). Instead, an operator pressing on the touch areas 418 and 420 slightly deforms a thin-walled surface. This deformation creates a detectable change in capacitance between the touch areas 418 and 420 and the capacitive touch sensors (illustrated in FIG. 5) located proximate thereto. This arrangement allows operator input to the modular ammunition counter without the requirement for additional cutouts and seals within the electronics assembly housing 104. Additionally, the capacitive interfaces reduce cost by eliminating the necessity to utilize moisture and particulate ingress rated buttons and seals.

Certain actions within context menus may require the operator to actuate both buttons and/or execute a long press for a specified duration, for example in order to avoid inadvertent zeroizing of counted rounds.

At least one of the recessed capacitive interfaces is electrically connected to a microcontroller interrupt line. This electrical connection allows the operator to wake the device from a battery-conserving low-power state.

Because the touch areas 418 and 420 are recessed within the electronics housing assembly 104, they protect against unintended actuation during device operation.

Figure 5:
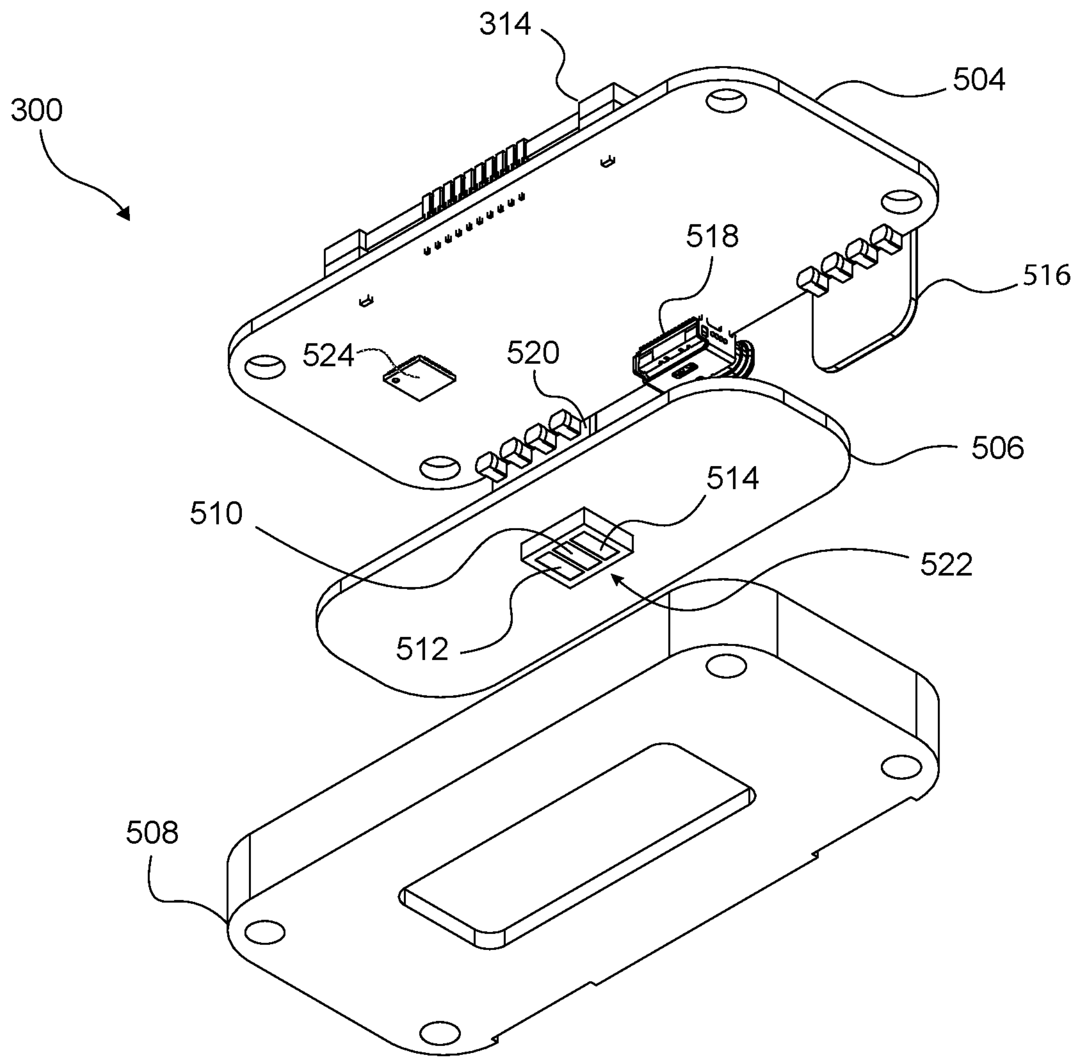
FIG. 5 is an exploded bottom perspective view of an implementation of an electronics assembly for use with the modular ammunition counter device of FIG. 1.

FIG. 5 illustrates an exploded perspective view of components disposed within the electronics assembly 300, including a main circuit board 504, a sensor printed circuit board 506, and an electronics assembly tray 508 that encloses the daughter board 506 and the main printed circuit board 504 and components mounted thereon. The electronics assembly 300 is located within housing 104 as shown in the top view of FIG. 3.

The display module 314 mounted on a top surface of the main printed circuit board 504 is also illustrated in FIG. 5. Further details of the components viewable in a top view of the electronics assembly 300 are described in detail in conjunction with FIG. 3.

In this particular implementation, the main printed circuit board 504 carries certain electronic components as required for operation of the modular ammunition counting device 100. The main printed circuit board may be constructed from common, readily accessible components familiar to those skilled in the art.

In one particular implementation, the main printed circuit board 504 may include a lithium-ion charge controller, and a universal serial bus power delivery controller, not shown. In some implementations, the main printed circuit board may interface with the sensor printed circuit board 506 (also referred to as a daughterboard) as shown in FIG. 5.

The main printed circuit board 504 may include a microcontroller 524 for interpretation of signals from a sensor module 522, accepting and interpreting operator inputs through the capacitive interfaces 418 and 420 of FIG. 4, and controlling the display module 314.

The sensor module 522 is operatively coupled to the daughterboard 506, that serves as an intermediary between the sensor module 522 and the main printed circuit board 504. The ammunition cartridges are counted as they pass through the ammunition guide 108 (see FIG. 1) that is located below the sensor module 522. The daughterboard may also be constructed from common, readily accessible components familiar to those skilled in the art.

In various implementations, the sensor module may include infrared light sensors, time of flight sensors, LIDAR sensors, Hall effect sensors, mechanical switches, or any combination thereof.

In one implementation, the sensor module comprises two infrared phototransistors and one infrared light source, the operation of which is further described below. In some implementations, the infrared light source may include a single infrared light emitting diode.

In various implementations, the sensor module 522 may be configured such that the individual sensor elements are physically spaced apart by a predetermined distance. In an embodiment using light sensing, two phototransistors are spaced apart such that the voltage generated by one sensor are time-offset from the voltage generated by the other sensor.

For example, as ammunition passes through the device and reaches the first sensor the voltage generated by the first sensor begins to rise, however, the voltage from the second sensor has not yet begun to increase as the cartridge is not yet sufficiently close to the second sensor. As the ammunition proceeds farther, the voltage generated by the second sensor begins to increase, while the voltage generated by the first sensor begins to decline. This relationship or "offset" between the two generated voltages allows the device to sense the direction in which the cartridges are passing through the ammunition counting device and thereby count the rounds only as they move in a first direction. Rounds are not counted as they move in the opposite second direction, but they are subtracted from the count total, and counted again as the rounds move in the first direction again.

Figure 6:
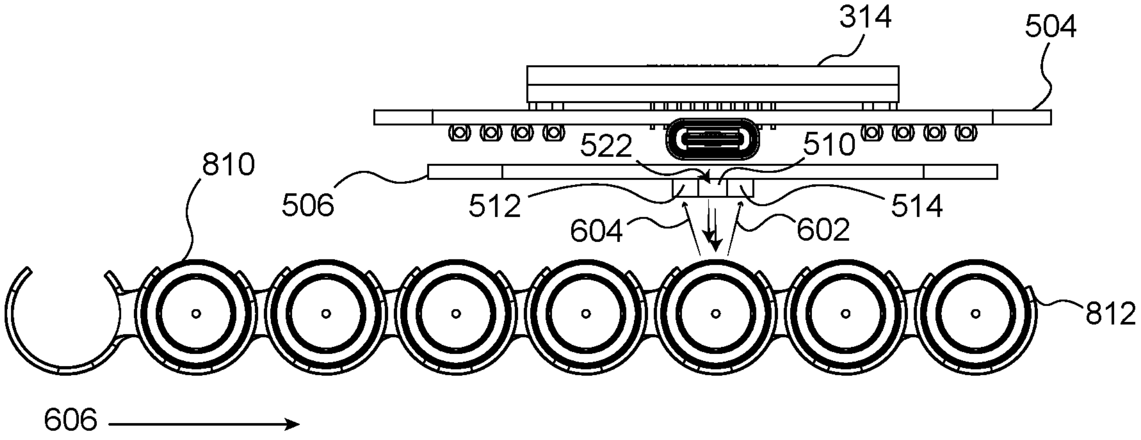
FIG. 6 illustrates the functionality of a sensor module for use with the modular ammunition counter device of FIG. 1.

FIG. 6 depicts the elements associated with the counting process with a side view of the main printed circuit board 504 and the daughter board 506. The elements of the sensor module 522 are also shown: an infrared phototransistor 512, an infrared phototransistor 514, and a single infrared light emitting diode 510 disposed between the phototransistors 512 and 514. The signal generated by each of the phototransistors is input to the microcontroller 524 (see FIG. 5) for processing the input signals and thereby counting the ammunition cartridges.

As ammunition passes in the forward direction (indicated by the arrowhead 606) the reflected light 604 is first sensed by the infrared phototransistor 512. As ammunition cartridges progress further into the device reflected light 602 falls onto the infrared phototransistor 514.

The physical spacing or offset between the two sensors (that is, the phototransistors 512 and 514 in FIG. 6) generates a quadrature encoded signal that is input to the microcontroller 524. This signal may comprise an analog or a digital signal. The quadrature encoded signal allows the device to sense the number of rounds that have travelled underneath the sensor module 522 and the direction of travel, as described in conjunction with FIGS. 7A and 7B.

Note that the phototransistors can be biased with a proper load resistor to attain a "digital" output or the transistors can be configured to produce an analog output that is proportional to the amount of light reflected back to the phototransistors. In the analog embodiment the output signal from the phototransistors is input directly to the microcontroller. Within the microcontroller the signal is input to an analog-to-digital converter. The ability to process either analog or digital signals offers flexibility and allows calibrations to change on the fly (either due to sensor derating/age or temperature). In another embodiment the analog-to-digital conversion can be achieved external to the microcontroller with integrated circuit comparators and passive components.

Figure 7A:
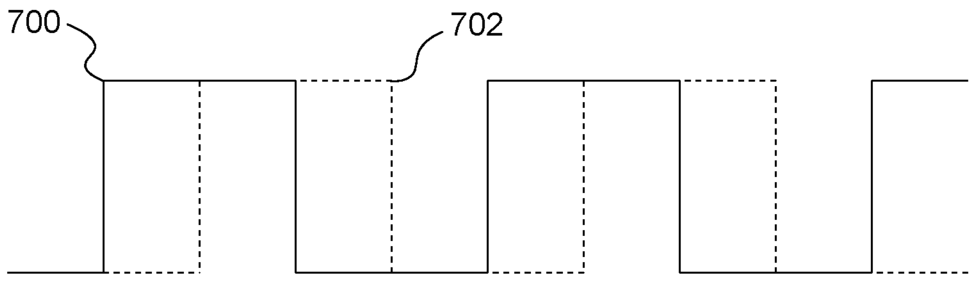
FIGS. 7A and 7B Illustrates the signal response from the sensor module implementation of FIG. 6 in the forward and reverse direction of ammunition travel.
Figure 7B:
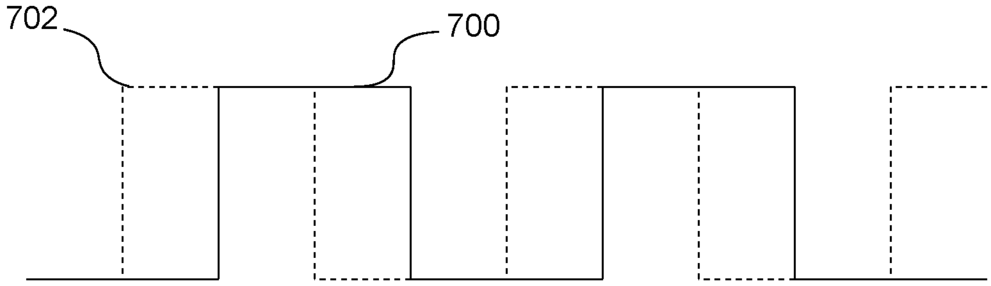

Referring now to FIGS. 7A and 7B, a timing relationship between signals generated by the infrared phototransistors establishes what is known in the art as a quadrature encoder. Typical quadrature encoders are utilized to sense rotary motion, however, the arrangement of the present invention, comprising a single infrared light emitting diode 510 and at least two infrared phototransistors 512 and 514 form a linear quadrature encoder.

As ammunition cartridges are fed into the modular ammunition counter 100, the reflected light (see FIG. 6) is detected first by the first-encountered infrared phototransistor. For a direction of travel indicated by arrowhead 606, the first-encountered or leading phototransistor is the phototransistor 512. As the voltage output from the phototransistor 512 reaches a predetermined threshold, the microcontroller 524 records a logical high state 700. See FIG. 7A for the forward travel direction waveforms.

As ammunition cartridges are further fed into the modular ammunition counter 100, the leading (relative to the direction of travel of the rounds) phototransistor state 700 within the microcontroller remains high and reflected light is now detected by the trailing infrared phototransistor 514, which generates a logical high state 702. Note that a leading edge of the high state 700 (as generated by the phototransistor 512) precedes in time a leading edge of the high state 702 (as generated by the phototransistor 514).

The order in which logical states transition determines the direction of travel of the ammunition cartridges. For example, in the aforementioned scenario the logical state 700 of phototransistor 512 transitioned to high prior to the logical state 702 of phototransistor 514. In this instance, the ammunition is determined to have travelled in the forward direction, as indicated by the arrowhead 606 (see FIG. 6) and the count is incremented by one.

As now shown in FIG. 7B, a leading edge of the high state pulse 702, as generated by the phototransistor 514, precedes in time the leading edge of the high state 700, as generated by the phototransistor 512. In this instance, the ammunition is determined to have travelled in the reverse direction from the arrowhead 606 of FIG. 6, and the count is decremented by one.

This direction of travel indicator allows for rapid counting of ammunition without a mechanical means of indexing belted ammunition. As the device is capable of sensing the direction, small slips of the operator in either direction are accounted for and do not affect the accuracy of the count.

The inventor designed the ammunition counter such that there is a preferred ergonomic orientation of the counter for inserting the ammunition. Intuitively, an operator will always insert the ammunition in the same direction. However, the directional counting feature was implemented after the inventor observed poor results from a single sensor implementation, caused by either operator error or hysteresis effects of the sensors.

To control the ammunition counter, in one implementation, operator input is supplied via one or both of the capacitive touch sensors 516 and 520 of FIG. 5 (disposed within recessed touch areas 418 and 420 (see FIG. 4)) to the main printed circuit board 504. These signals are interpreted by a microprocessor 524 carried on the main printed circuit board 504. The recessed touch sensors 418 and 420 may be configured to sense deflection of the thin-walled regions of metal that form one capacitor plate within the touch 418 and 420. The deflection causes a change in capacitance that is sensed by the microprocessor 524.

In one embodiment the counter enters a sleep state after a predetermined time has elapsed from the last counting action. The processor, and thus the counter, are awakened from that sleep state by interrupts produced when the operator applies sufficient pressure to one or both of the recessed touch areas 418 and 420 causing a corresponding change in the capacitive touch sensors 516 or 518. This power saving mode obviously conserves power and extends battery life between recharging intervals.

When the counter has reached a full-powered "on" state, the operator may set up the counter to count rounds. The set up-process only requires that the operator utilize the correct ammunition guide 108 (see FIG. 1) that matches the caliber of the ammunition rounds.

Figure 8:
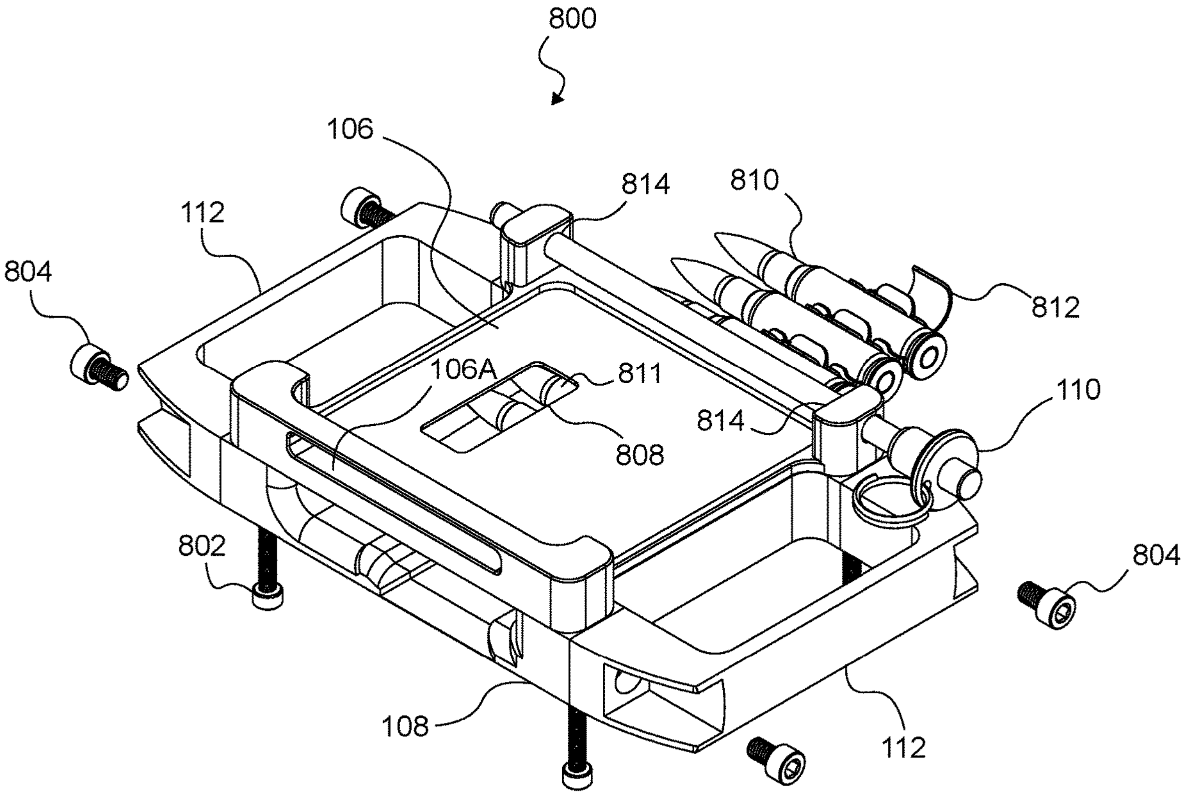
FIGS. 8 and 9 are perspective views of implementations of ammunition guides for different caliber ammunition for use with the modular ammunition counter device of FIG. 1.

Referring now to FIG. 8, a perspective view of an implementation of a modular ammunition counter ammunition guide assembly 800 is illustrated. In this particular implementation, the ammunition guide assembly is specified for use with NATO 7.62×51 mm ammunition. Different ammunition guide assemblies may be specified to accommodate different caliber ammunition.

As described previously and illustrated in various figures of various implementations, the ammunition guide assembly 800 may include the quick release fixture plate 106 with the ammunition guide 108 and handles 112 affixed thereto.

In some implementations, the quick release fixture plate 106 may include a machined opening 106A. See FIG. 8. The machined opening 106A receives a mating fixed shoe 408 (see FIG. 4) attached to the electronics assembly housing 104. Mating of the shoe 408 within the machined opening 106A accurately mates the ammunition guide assembly 800 and the electronics assembly housing 104. See FIG. 1 for the mated configuration.

In another embodiment, in lieu of the machined opening 106A, a slot or recess is formed in an injection molded plastic block, for example, where the block extends upwardly from the quick release fixture plate 106, as illustrated in FIG. 1.

Continuing with FIG. 8, a pair of quick release pin horns 814 may be included in opposing relation to the machined opening 106A and spaced apart at a distance required to accommodate the electronics assembly housing 104. This particular arrangement of the fixed shoe and the quick release pin permits attachment of the electronics assembly housing 104 to the quick release fixture plate 106 and retention thereof by operation of the quick release pin 110. See FIGS. 1 and 8.

In alternative implementations, the quick release feature may be accomplished by other techniques and components, such as by utilizing Arca-Swiss interfaces, known by those skilled in the art, quick release pins, flip locks, lever locks, twist locks, any other suitable means, or any combination thereof. The quick-release feature is defined by any means of attachment of the electronics assembly housing 104 to the quick-release fixture plate 106 that does not require additional tools or equipment to be utilized by the operator.

Note that the electronics assembly housing 104 is absent from the FIG. 8 illustration, therefore exposing the ammunition cartridges 811 through the sensor cutout 808 in the quick release fixture plate 106. This cutout 808 allows the sensor module 522 of the electronics housing assembly 104 (see FIG. 4) optical and physical access to the ammunition cartridges 810 passing through the ammunition guide 108 as illustrated.

Figure 11:
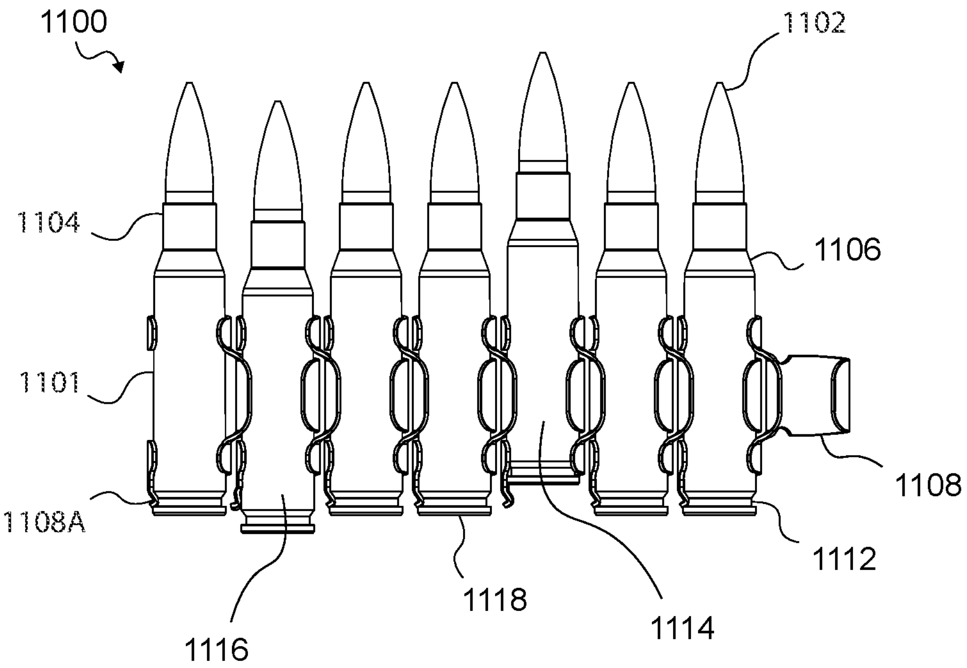
FIGS. 11 and 12 illustrate the interface of a 7.62 mm NATO ammunition belt assembly and round repositioning geometry within the ammunition guide of FIG. 1.
Figure 12:
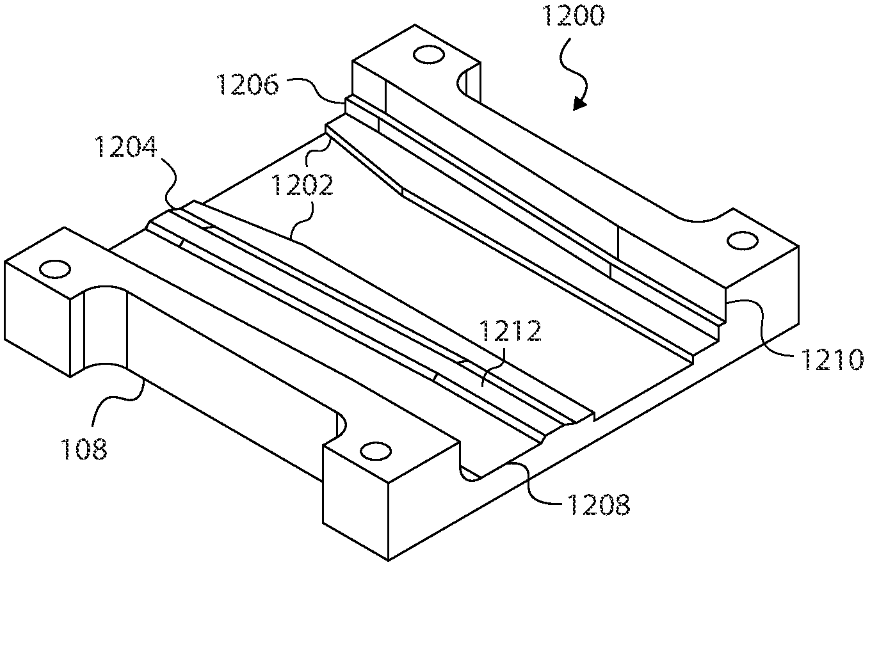

In some implementations, the ammunition guide 108 incorporates round repositioning geometry 1200 (see FIG. 12). The round repositioning geometry serves to rapidly reposition rounds to the correct location on the ammunition link 1108 (see FIG. 11) and ensure correct alignment for accurate detection by the sensor module and position ammunition properly within the ammunition belt assembly 1100 (see FIG. 11) to mitigate weapon stoppages due to misaligned ammunition. This interface of the repositioning geometry 1200 and the belt assembly 1100 will be described in further detail in conjunction with FIG. 11.

Continuing with FIG. 8, the quick release fixture plate 106 may be affixed to the ammunition guide 108 with a set of screws 802 from below.

Figure 9:
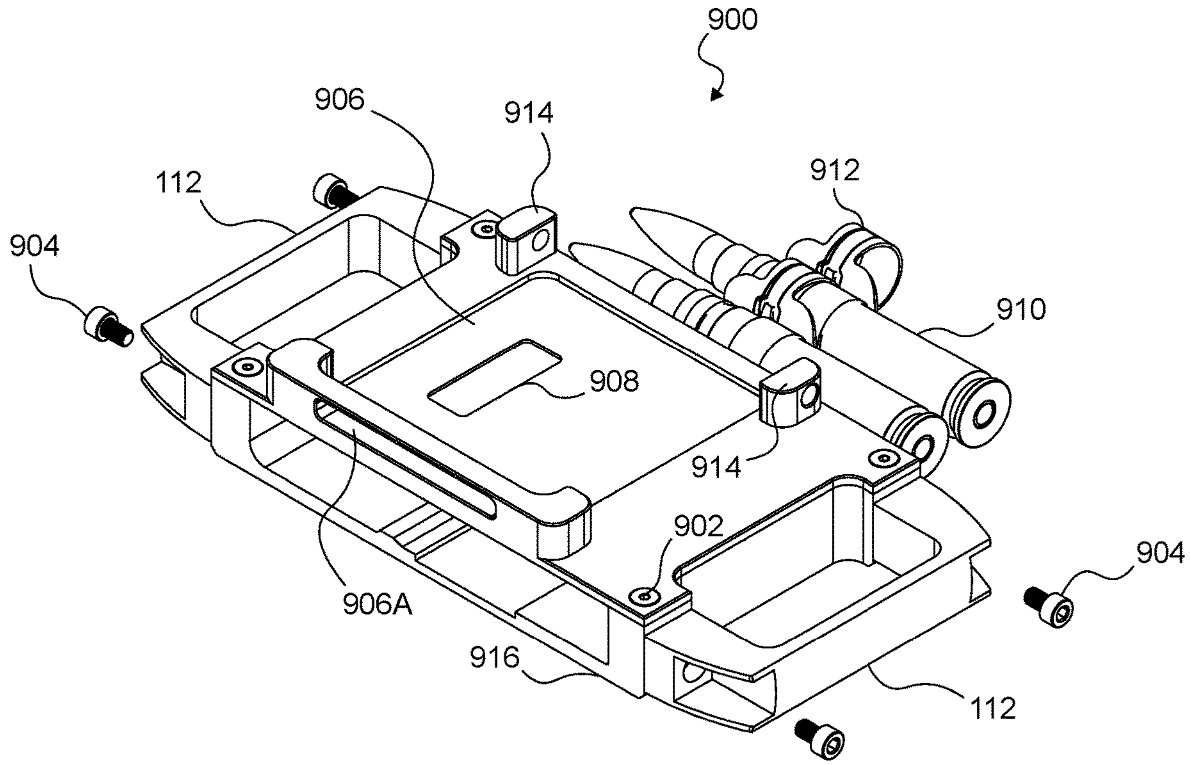

Referring now to FIG. 9, a perspective view of one implementation of a modular ammunition counter ammunition guide assembly is illustrated and referred to by reference numeral 900. In this particular implementation, the ammunition guide assembly is specified for use with .50 BMG ammunition. Like the ammunition guide assembly 800 depicted in FIG. 8, the guide assembly 900 may include an ammunition guide 916. As previously mentioned, the ammunition guide may be specified to accommodate any caliber or configuration of ammunition.

Similar to the aforementioned embodiment of FIG. 8, the ammunition guide of FIG. 9 may include a quick release fixture plate 906, and a shoe retainer 911 that defines a slot 911A for receiving the shoe 408 attached to the electronics assembly housing 104. See FIG. 4. Here too, as in FIG. 8, the quick release fixture plate 906 may be affixed to the ammunition guide 908 with a set of screws 902.

In some implementations, a set of quick release pin horns 914 operate in the same manner as the aforementioned quick release pin horns 814 for removably attaching the quick release fixture plate to the electronics assembly housing 104. The ammunition guide assembly may include a sensor cutout 908 that provides the same functionality as the aforementioned sensor cutout 808 of FIG. 8.

FIGS. 8 and 9 illustrate configurations for two different ammunition calibers and are included only for exemplification of implementation.

FIG. 10 is an exploded view of the components attached to the quick release fixture plate 106, including the ammunition guide 108 and the handles 112. FIG. 10 also depicts fastenings for attaching the illustrated components.

FIG. 11 is a perspective top view of a 7.62 mm NATO ammunition belt assembly 1100. The ammunition belt assembly 1100 consists of a plurality of ammunition cartridges 1101 joined to one another by means of an ammunition link 1108. This structure is then repeated any number of times in order to create an ammunition belt of desired length (or of a desired ammunition count). While this is the most typical configuration of belted ammunition, the ammunition guide 108 may be specified to interface with any type of ammunition.

A projectile 1102 may be installed in each cartridge 1101; in some configurations the projectile is omitted and is referred to as a blank cartridge. A cartridge is defined as aligned within the ammunition belt assembly 1100 when a link position tab 1108A is seated within the machined recess 1112 (or extractor groove) within the cartridge 1101. A cartridge that is positioned forward of the locking tab 1108A is referred to as a fore misaligned cartridge 1114. Similarly, a cartridge that is positioned aft of the locking tab 1108A is referred to as an aft misaligned cartridge 1116. The cartridge 1101 may contain a machined region 1104 which will herein be referred to as the cartridge neck. Additionally, the cartridge 1101 may also contain a machined region 1106 which will be referred to as the cartridge shoulder. The aft end of the cartridge (as viewed in FIG. 11) defines the cartridge base 1118. These features are incorporated for reference only and will be further described in conjunction with FIG. 12.

Referring now to FIG. 12, a perspective view of one implementation of round repositioning geometry within the ammunition guide of FIG. 1 is illustrated. A cartridge link mouth 1202 is defined by two machined inclined planes that allow misalignment of ammunition link locking tabs 1108A as they enter the ammunition guide 108. This misalignment is not characteristic of the aforementioned fore and aft misaligned cartridges, however is due to belt misalignment as it enters the modular ammunition counter 100.

The ammunition links 1108A seat within the recessed link mouth 1202 and allow for subsequent alignment of cartridges. A cartridge shoulder ramp 1204 may be incorporated within the ammunition guide 108 to allow for repositioning of the aforementioned fore misaligned cartridge 1114 (see FIG. 11). The shoulder ramp 1204 exerts force against the cartridge shoulder 1106 to reposition it on the ammunition belt assembly 1100 and seat the link locking tab 1108A within the cartridge extractor groove 1112.

A base ramp 1206 is additionally disposed within the ammunition guide 108 to enable repositioning of aft misaligned rounds 1116 (see FIG. 11). The base ramp 1206 exerts force against the cartridge base 1118 as they travel through the ammunition guide. This action serves to push the cartridge forward on the ammunition belt assembly 1100 ultimately positioning the link locking tab 1108A within the cartridge extractor groove 1112 in a similar fashion as the shoulder ramp 1202. A recessed primer well 1210 is disposed directly above the base ramp 1206 to eliminate forces applied to a cartridge primer (not shown in FIG. 11). Furthermore, a projectile well 1208 may be incorporated within the ammunition guide 108 to eliminate physical contact between the guide 108 with the projectile 1102 and influence ballistic characteristics. The cartridge support 1212 may be incorporated to physically support the cartridge neck 1104 within the guide 108.

Theory of Operation

Referring to FIG. 1, the electronics assembly housing 104 is coupled to the electronics assembly housing cover 102. The operator selects a pre-assembled ammunition guide that is specified for the caliber of ammunition to be counted. This pre-assembled ammunition guide includes the quick release fixture plate 106, handles 112 and an ammunition guide sized for the ammunition caliber to be counted.

The operator then mates the housing 104 to the quick release fixture plate 106 (which is in turn coupled to the ammunition guide 108 and the handles 112. The fixed shoe 408 of the housing 104 fits and locates within the machined opening 106A within the fixture plate 106. The opposing side of the electronics assembly housing 104 is secured through the use of a quick release pin 110.

The device is configured to allow the operator to rapidly transition between counting different ammunition calibers by securing the electronic housing 104 to the quick-release fixture plate and thus to ammunition guide 108 by means of the quick-release pin 110.

The counter may also be configured to enter a deep sleep mode requiring operator intervention to power-up. The capacitive buttons 418, 420 (see FIG. 4) allow operator input, including powering up the counter, menu selection, and other programmable functions.

In various implementations, the display module 314 (see FIG. 1) may be included to allow the operator to view device information, number of current rounds counted, and other programmable information.

Referring now to FIGS. 4 and 5, in this particular implementation, operator input from the thin-walled capacitive flexure 418 is sensed by capacitive touch sensor 516 Similarly to capacitive flexure 418, operator input from capacitive flexure 420 is sensed by capacitive touch sensor 520. The signals from the capacitive touch sensors are piped into capacitive touch integrated circuits. In various implementations, the device may be awakened from a deep sleep power saving mode utilizing microcontroller interrupts.

The operator may also traverse through menu selections utilizing capacitive button 418 and capacitive button 420; the operator may query for current rounds counted, total lifetime rounds counted, estimated battery life, and device hardware information. The modular ammunition counter 100 may be configured to allow the operator to enter calibration data, see device usage statistics and estimated remaining lifecycle before calibration or repair, or place the device in an ultra-low power hibernation state for long-term storage.

When the device reaches a full powered-on state, the operator may begin counting ammunition cartridges 810 as they pass through the ammunition guide 108. To begin the counting process, the operator inserts the ammunition into the ammunition guide and manually pulls the ammunition through the device in either direction. The modular ammunition counter is bidirectional, allowing the operator to begin counting ammunition cartridges inserted into either side of the device.

As ammunition is fed into the modular ammunition counter, the ammunition cartridges 810 in FIG. 8 or cartridges 910 in FIG. 9 pass below the sensor cutout 808 in FIGS. 8 and 908 in FIG. 9. The infrared light emitting diode 510 emits infrared light down toward the cartridge 810/910. As the cartridge 810/910 approaches the leading infrared phototransistor 514 (see FIG. 6) reflected infrared light 602 reaches a predetermined detection threshold. The signal from the leading phototransistor 514 is routed to the microcontroller 524 where a logic high state 702 is recorded. See FIG. 7.

As the cartridge further progresses through the device, the trailing phototransistor 512 begins receiving reflected infrared light 604. The signal from the trailing phototransistor is also routed to the microcontroller 524 where a logic high state 700 is recorded. The order in which logical states transition indicates the direction of travel of the ammunition cartridges through the modular ammunition counter 100.

For example, in the aforementioned scenario of FIG. 7, the first encountered phototransistor transitioned to a high logical state 702 prior to the second encountered transitioning to the high logical state 700. In this instance, the ammunition is determined to have travelled in the direction of the arrowhead 606 of FIG. 6 and the count is incremented by one.

As known by those skilled in the art, there are several different forms of ammunition, all of which are considered ammunition rounds for counting by the inventive ammunition counting device. For example, blanks are generally considered as a form of ammunition since they include a live primer. "Dummy" ammunition includes a fake primer or no primer, but includes a real projectile, albeit no propellent. Blank ammunition is used with a weapon to simulate the firing of real ammunition with the sound and recoil of primer ignition. Dummy ammunition serves as an ammunition mock up or model for illustration and training purposes. Counting these other forms of ammunition is important as they are both typically used in large quantities and manual counting is time consuming and subject to errors. Thus, use of the present invention to count these other forms of ammunition rounds is especially advantageous.

What is claimed is:

1. An ammunition counting device, comprising:
- an ammunition guide for accepting ammunition rounds;
- two sensors disposed along a path that the ammunition rounds travel through the ammunition guide, each sensor for producing a sensor signal upon detecting presence of an ammunition round;
- an electronics assembly for receiving sensor signals and producing a count signal responsive thereto, wherein a direction of travel of the ammunition rounds through the ammunition guide is responsive to a sequence of sensor signals from the two sensors such that an ammunition round passing in a first direction produces a count signal representing a count of plus one and an ammunition round passing in a second direction opposite to the first direction produces a count signal representing a count of minus one, wherein the ammunition count is responsive to the count signals;
- a display responsive to the electronics assembly for displaying the ammunition count;
- a fixture plate attached to the ammunition guide, wherein the ammunition rounds pass below the fixture plate;
- a pin for passing through spaced-apart pin horns affixed to an upper surface of the fixture plate proximate a first edge of the fixture plate;
- the fixture plate further comprising a projection extending from the upper surface proximate a second edge of the fixture plate, the projection defining an opening or slot therein, the second edge opposite the first edge;
- the electronics assembly further comprising a shoe disposed on a first surface thereof, the shoe for mating with the opening or slot; and
- the pin exerting a force on a second surface of the electronics assembly for retaining the shoe within the opening or slot, the second surface opposite the first surface.

2. The ammunition counting device of claim 1, further comprising a power source for supplying power to the electronics assembly, wherein the power source further comprises a battery or an adapter responsive to an alternating current for producing a direct current.

3. The ammunition counting device of claim 1, wherein the ammunition rounds are manually or automatically fed into the ammunition guide.

4. The ammunition counting device of claim 1, wherein the ammunition rounds comprise belted ammunition rounds or a plurality of singular rounds.

5. The ammunition counting device of claim 1, wherein the ammunition guide is configured to accept only a predetermined caliber of ammunition rounds.

6. The ammunition counting device of claim 1, wherein the ammunition count comprises a current ammunition count or a final ammunition count.

7. The ammunition counting device of claim 1, wherein the electronics assembly comprises a microprocessor for receiving the count signal and for controlling the display for displaying the ammunition count, wherein the ammunition count comprises a current count, a final count, or an operational state of the ammunition counting device.

8. The ammunition counting device of claim 1, further comprising a capacitive touch sensor input device for activation by an operator to issue commands to the electronics assembly for controlling operation of the ammunition counting device.

9. The ammunition counting device of claim 1, further comprising a communications port for receiving signals from an external device and providing signals to the external device, the signals related to operation of the ammunition counting device.

10. The ammunition counting device of claim 1, wherein each one of the two sensors comprises an energy emitting element further comprising a light or a sound emitting element, and each one of the two sensors comprises an energy receiving element further comprising a respective light or a sound receiving element.

11. The ammunition counting device of claim 10, wherein the energy emitting element comprises a light emitting diode (LED) and the energy receiving element comprises a first and a second spaced-apart photosensor each for receiving light reflected from an ammunition round, and wherein the ammunition count is responsive to the reflected light and to the sequence in which the reflected light is received by the first and second photosensors.

12. The ammunition counting device of claim 1, wherein the ammunition counting device counts a positive number when the ammunition round is moving in a first direction through the ammunition counting device, and counts a negative number when the ammunition round is moving in a second direction opposite the first direction through the ammunition counting device.

13. The ammunition counting device of claim 1, further comprising ammunition repositioning projections disposed on a surface of the ammunition guide over which the ammunition rounds pass, wherein as a misaligned ammunition round passes over the surface, the repositioning projections exert forces against the misaligned ammunition round to reposition the misaligned round to an aligned orientation.

14. The ammunition counting device of claim 1, wherein the display is disposed on an exterior surface of the ammunition counting device.

15. The ammunition counting device of claim 1, further comprising an energy emitting element directing energy toward the ammunition rounds, wherein the sensor signals produced by the two sensors are responsive to energy reflected from the ammunition rounds.

16. The ammunition counting device of claim 1, the ammunition guide configured to accept ammunition rounds of only one caliber.

17. The ammunition counting device of claim 1, further comprising a first and second handle disposed on opposing side surfaces of the ammunition guide.

* * * * *